United States Patent
Merrill et al.

(10) Patent No.: US 7,065,462 B2
(45) Date of Patent: Jun. 20, 2006

(54) VEHICLE WHEEL ALIGNMENT BY ROTATING VISION SENSOR

(75) Inventors: M. Stanley Merrill, Denver, CO (US); Ted Combs, Longmont, CO (US); Richard Sutton, Matlock (GB)

(73) Assignee: Merilab, Inc., Englewood, CO (US)

(*) Notice: Subject to any disclaimer, the term of this patent is extended or adjusted under 35 U.S.C. 154(b) by 165 days.

(21) Appl. No.: 10/418,986

(22) Filed: Apr. 18, 2003

(65) Prior Publication Data

US 2004/0039544 A1 Feb. 26, 2004

Related U.S. Application Data

(63) Continuation-in-part of application No. 09/591,434, filed on Jun. 9, 2000, now abandoned, which is a continuation of application No. 09/122,503, filed on Jul. 24, 1998, now Pat. No. 6,151,562.

(60) Provisional application No. 60/373,455, filed on Apr. 18, 2002.

(51) Int. Cl.
*G01C 17/38* (2006.01)
*G01P 21/00* (2006.01)
*G06F 19/00* (2006.01)

(52) U.S. Cl. .................. 702/95; 702/150

(58) Field of Classification Search .......... 356/139.1, 356/139.04–139.09, 155; 702/95, 150; 701/29; 33/288, 203.1; 250/559.3, 225; 700/57–59; 73/459

See application file for complete search history.

(56) References Cited

U.S. PATENT DOCUMENTS

| | | |
|---|---|---|
| 3,641,849 A | 2/1972 | Kinney |
| 3,876,310 A | 4/1975 | Berndt |
| 3,879,988 A | 4/1975 | Jacobs |
| 3,888,592 A | 6/1975 | Geul |

(Continued)

FOREIGN PATENT DOCUMENTS

| | | |
|---|---|---|
| DE | 27 27 420 | 1/1979 |
| DE | 29 48 573 | 6/1981 |
| JP | 55-107907 | 8/1980 |
| JP | 57-137808 | 8/1982 |
| JP | 06-011420 | 1/1994 |

OTHER PUBLICATIONS

G. Jones, "Contactless Measurement Goes the Distance," Distance measurement, p. 139, 1985.
C. Silvaggi, F. Luk and W. North, "Position/Dimension by Structured Light," Experimental Techniques, pp. 22–25, 1986.

(Continued)

*Primary Examiner*—Michael Nghiem
*Assistant Examiner*—Aditya Bhat
(74) *Attorney, Agent, or Firm*—Faegre & Benson, LLP (57) ABSTRACT

Apparatus and methods are provided for measuring vehicle wheel alignment characteristics. According to one embodiment, during a first measurement cycle, spatial coordinates of multiple points on the wheel are obtained by positioning a vision sensor at various angular offsets relative to the wheel, the multiple points representative of samples from each of the various angular offsets. After the first measurement cycle and before the second measurement cycle, the wheel is rotated at least a partial revolution. During the second measurement cycle, spatial coordinates of multiple points on the wheel are obtained by positioning the vision sensor at various angular offsets relative to the wheel, the multiple points representative of samples from each of the various angular offsets. Finally, one or more characteristics of the wheel are determined based upon the spatial coordinates collected during the first measurement cycle and the spatial coordinates collected during the second measurement cycle.

24 Claims, 9 Drawing Sheets

U.S. PATENT DOCUMENTS

| | | | |
|---|---|---|---|
| 3,951,551 A | 4/1976 | Macpherson | |
| 4,111,557 A | 9/1978 | Rottenkolber et al. | |
| 4,134,682 A | 1/1979 | Calk | |
| 4,142,299 A | 3/1979 | Alsina | |
| 4,188,544 A | 2/1980 | Chasson | |
| 4,249,824 A | 2/1981 | Wiederrich et al. | |
| 4,254,433 A | 3/1981 | Dewar, Jr. et al. | |
| 4,326,808 A | 4/1982 | Pryor et al. | |
| 4,337,581 A | 7/1982 | Eck | |
| 4,349,965 A | 9/1982 | Alsina | |
| 4,373,804 A | 2/1983 | Pryor et al. | |
| 4,575,805 A | 3/1986 | Moermann et al. | |
| 4,576,482 A | 3/1986 | Pryor | |
| 4,594,001 A | 6/1986 | DiMatteo et al. | |
| 4,645,348 A | 2/1987 | Dewar et al. | |
| 4,647,208 A | 3/1987 | Bieman | |
| 4,660,970 A | 4/1987 | Ferrano | |
| 4,662,752 A | 5/1987 | Tucker et al. | |
| 4,690,557 A | 9/1987 | Wiklund | |
| 4,705,401 A | 11/1987 | Addleman et al. | |
| 4,727,471 A | 2/1988 | Driels et al. | |
| 4,745,469 A | 5/1988 | Waldecker et al. | |
| 4,753,569 A | 6/1988 | Pryor | |
| 4,761,072 A | 8/1988 | Pryor | |
| 4,764,016 A | 8/1988 | Johansson | |
| 4,821,200 A | 4/1989 | Öberg | |
| 4,822,163 A | 4/1989 | Schmidt | |
| 4,856,199 A | 8/1989 | Merrill et al. | |
| 4,863,266 A | 9/1989 | Masuko et al. | |
| 4,889,425 A | 12/1989 | Edwards et al. | |
| 4,899,218 A | 2/1990 | Waldecker et al. | |
| 5,054,918 A * | 10/1991 | Downing et al. | 356/139.09 |
| 5,056,233 A | 10/1991 | Hechel et al. | |
| 5,124,524 A | 6/1992 | Schuster et al. | |
| 5,140,534 A | 8/1992 | Miller et al. | |
| 5,268,731 A | 12/1993 | Fuchiwaki et al. | |
| 5,421,095 A | 6/1995 | Matteucci | |
| 5,488,471 A | 1/1996 | McClenahan et al. | |
| 5,489,979 A | 2/1996 | Corghi | |
| 5,489,983 A | 2/1996 | McClenahan et al. | |
| 5,506,683 A | 4/1996 | Yang et al. | |
| 5,519,489 A | 5/1996 | McClenahan et al. | |
| 5,600,435 A * | 2/1997 | Bartko et al. | 356/139.09 |
| 5,724,128 A * | 3/1998 | January | 356/139.09 |
| 5,731,870 A * | 3/1998 | Bartko et al. | 356/139.09 |
| 5,742,129 A | 3/1998 | Matteucci | |
| 5,748,854 A | 5/1998 | Watanabe et al. | |
| RE35,816 E | 6/1998 | Schulz | |
| 5,781,286 A * | 7/1998 | Knestel | 356/139.09 |
| 5,812,256 A | 9/1998 | Chapin et al. | |
| 5,821,943 A | 10/1998 | Shashua | |
| 5,850,290 A | 12/1998 | Horiguchi et al. | |
| 5,870,315 A * | 2/1999 | January | 700/279 |
| 5,886,350 A * | 3/1999 | Cook et al. | 250/225 |
| 5,886,781 A | 3/1999 | Muller et al. | |
| 5,943,783 A * | 8/1999 | Jackson | 33/288 |
| 5,969,246 A * | 10/1999 | Jackson et al. | 73/459 |
| 5,981,965 A | 11/1999 | Pryor et al. | |
| 5,987,591 A | 11/1999 | Jyumonji | |
| 6,064,759 A | 5/2000 | Buckley et al. | |
| 6,078,846 A | 6/2000 | Greer et al. | |
| 6,148,528 A * | 11/2000 | Jackson | 33/288 |
| 6,151,562 A * | 11/2000 | Merrill | 702/95 |
| 6,167,151 A | 12/2000 | Albeck et al. | |
| 6,181,993 B1 * | 1/2001 | Dale et al. | 701/29 |
| 6,219,134 B1 * | 4/2001 | Voeller et al. | 356/139.09 |
| 6,252,973 B1 | 6/2001 | January et al. | |
| 6,269,197 B1 | 7/2001 | Wallack | |
| 6,298,284 B1 * | 10/2001 | Burns et al. | 700/279 |
| 6,321,137 B1 | 11/2001 | De Smet | |
| 6,327,785 B1 * | 12/2001 | Dale et al. | 33/288 |
| 6,354,791 B1 * | 3/2002 | Wytman et al. | 414/744.3 |
| 6,397,164 B1 * | 5/2002 | Nobis et al. | 702/150 |
| 6,404,486 B1 * | 6/2002 | Nobis et al. | 356/139.09 |
| 6,466,845 B1 * | 10/2002 | Keener et al. | 700/279 |
| 6,594,600 B1 * | 7/2003 | Arnoul et al. | 702/94 |
| 6,862,544 B1 | 3/2005 | Merrill | |
| 2004/0039544 A1 | 2/2004 | Merrill | |

OTHER PUBLICATIONS

T. Kanade and T.M. Sommer, "An Optical Proximity Sensor for Measuring Surface Position and Orientation for Robot Manipulation," Robotics Institute, Carnegie–Mellon University, pp. 667–674, 1983.

H. Bruhn and A. Felske, "A New Optical Axle Measuring Instrument for Wheel Alignment in Assembly–Line Production," Society of Automotive Engineers, Inc., Document No.:850222, pp. 1–11, 1985.

A.K. Chang, "Automatic Wheel Alignment Measuring Instrument," 4$^{th}$ IECI Annual Conference Proceedings, Philadelphia, Pennsylvania, pp. 99–105, Mar. 20–22, 1978.

J.T. Olsztyn, L. Rossol. R. Dewar and N.R. Lewis, "An Application of Computer Vision to a Simulated Assembly Task," Proceedings of the First International Joint Conference on Pattern Recognition, pp. 505–513, Washington, D.C., Oct. 30–Nov. 1, 1973.

"New vehicle dynamics lab opens," Lawrence Technological University Magazine, On–Campus, p. 29, 1985.

\* cited by examiner

VEHICLE WHEEL ALIGNMENT BY ROTATING VISION SENSOR

This application claims the benefit of U.S. Provisional Application No. 60/373,455, filed Apr. 18, 2002 and is a continuation-in-part of U.S. application Ser. No. 09/591,434, filed on Jun. 9, 2000, now abandoned, which is a continuation of U.S. application Ser. No. 09/122,503, filed on Jul. 24, 1998, now U.S. Pat. No. 6,151,562, all of which are hereby incorporated by reference in their entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention generally relate to the field of computer vision and the field of measuring vehicle wheel alignment characteristics, such as camber and toe. More particularly, embodiments of the present invention relate to the use of a rotating vision sensor, such as a laser sensor, to map a portion of the vehicle tire and/or rim from which one or more alignment characteristics may be determined.

2. Description of the Related Art

Correct vehicle suspension and geometry improves the directional stability, tracking, cornering, and overall driveability of a vehicle while also increasing tire tread life and wear. Two primary vehicle wheel alignment characteristics are toe, which is generally defined as the slanting of the wheels toward the front or back of the vehicle, and camber, which is generally defined as the sloping of the wheels toward the top or bottom of the vehicle.

While several different measurement techniques are currently employed, the accurate measurement of wheel alignment is a surprisingly difficult problem to solve in a cost and time efficient manner. In a typical manufacturing process, the wheel alignment is measured in all vehicles as a part of the manufacturing process, and the wheel alignment of a relatively small percentage of vehicles, such as 4%, is measured a second time as an audit for determining the accuracy of the aligner used in the manufacturing process.

It would be desirable to audit a higher percentage of vehicles, so that the accuracy of the alignment process could be improved. However, the audit time of current alignment audit equipment is such that a significantly higher audit rate is not viable. Typical auditing devices currently in use are quite slow, and so cannot keep pace with a production line. While it may be possible to add more auditing devices to increase the audit percentage, the cost of so doing may be prohibitive.

In light of the above, it can be appreciated that an alignment system that is less expensive, quicker, and more accurate than known systems is a significant advance in the art. Manufacturers may be expected to save on warranty repairs, and vehicle owners may be relieved of the burden of purchasing a new vehicle that is not correctly aligned.

BRIEF DESCRIPTION OF THE SEVERAL VIEWS OF THE DRAWINGS

Embodiments of the present invention are illustrated by way of example, and not by way of limitation, in the figures of the accompanying drawings and in which like reference numerals refer to similar elements and in which.

SUMMARY

Apparatus and methods for measuring vehicle wheel alignment characteristics are described. According to one embodiment of the present invention, two measurement cycles are performed between which the wheel being characterized is rotated. During a first measurement cycle, spatial coordinates of multiple points on the wheel are obtained by positioning a vision sensor at various angular offsets relative to the wheel, the multiple points representative of samples from each of the various angular offsets. After the first measurement cycle and before the second measurement cycle, the wheel is rotated at least a partial revolution. During the second measurement cycle, spatial coordinates of multiple points on the wheel are obtained by positioning the vision sensor at various angular offsets relative to the wheel, the multiple points representative of samples from each of the various angular offsets. Finally, one or more characteristics of the wheel are determined based upon the spatial coordinates collected during the first measurement cycle and the spatial coordinates collected during the second measurement cycle.

Other features of embodiments of the present invention will be apparent from the accompanying drawings and from the detailed description that follows.

DETAILED DESCRIPTION OF THE INVENTION

Apparatus and methods are described for measuring vehicle wheel alignment characteristics. Broadly stated, embodiments of the present invention employ a rotating vision sensor, such as a non-contact laser sensor, to map a portion of a vehicle's wheel, which allows for the determination of the plane of the wheel (and thereby various alignment characteristics, such as the "toe" and "camber" of the wheel). According to one embodiment, two measurement cycles are performed between which the vehicle's wheels are rotated at least a partial revolution. For example, the vehicle may be left in place and the "floor" may be moved under the wheels by a known amount. Alternatively, the vehicle may be moved forward or backward to rotate the wheels. However, the forces employed to push or pull the vehicle may introduce error.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware and software.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to a particular type of non-contact sensor (i.e., a Digital TriCam manufactured by Perceptron of Plymouth, Mich.) and a particular mechanism for rotating the non-contact sensor (i.e., a rotary blade), embodiments of the present invention are equally applicable to various other non-contact sensors and positioning mechanisms. For example, with respect to alternative non-contact sensors, the Diffracto brand sensor manufactured by LMI Technologies Inc. may be employed to perform the distance measurement functions described herein. With respect to alternative positioning mechanisms, robotic arms, circular tracks and the like may be employed to position the non-contact sensor relative to the target object. Furthermore, in addition to wheel alignment, measurement and audit, it is contemplated that embodiments of the present invention will be applicable to various other usage models.

Terminology

Brief definitions of terms used throughout this application are given below.

The term "camber" generally refers to a wheel alignment characteristic representing the sloping of a wheel toward the top or bottom of the vehicle. The terms "connected", "coupled" or "joined" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

The term "rim" generally refers to the circular outer part of a wheel typically furthest from the axle. A rim is typically a metal or alloy structure around which a tire is fitted.

The term "toe" generally refers to a wheel alignment characteristic representing the slanting of a wheel toward the front or back of the vehicle.

The term "wheel" typically refers to a circular frame of hard material that may be solid, partly solid, or spoked and that is capable of turning on an axle. However, because embodiments of the present invention have utility with respect to characterizing a wheel, a tire, a rim individually and/or in combination, the term "wheel" is used herein to refer broadly to a wheel, a tire, a rim or any combination of these.

Conceptual Overview

When a rotating measurement device measures distance to a plane that is not perpendicular to the axis of rotation, the distance measurements to the plane yield a sinusoidal output. Further, if the plane itself is not perfectly flat but has an error in its plane—in the form of a wheel with "wobble," then the distance output is the sum of two sinusoids—one for the plane itself and one for the wobble.

In the case of measuring wheel alignment, taking a second measurement after rotating the wheel yields another sum of the two sinusoids with the exception that the wheel's wobble has changed in the phase corresponding to the wheel's rotation, whereas the basic plane of the wheel (due to its axis of rotation) has not changed.

It is by recognizing this interrelation that the assignee of the present invention developed algorithms to separate the two sinusoids (e.g., remove the error or wobble) by capturing a first sum of the two sinusoids while the wheel is in a first position, rotating the wheel at least a partial revolution to a second position, capturing a second sum of the two sinusoids, and then keeping the portion that remains the same between measurements (the basic plane of the wheel) and discarding the portion that changes in phase between measurements (the error or wobble).

Consequently, a vision sensor, such as a laser camera, may be used to determine toe and camber of a vehicle wheel. During a first measurement cycle, the laser camera may be rotated along a circle that lies in a plane that is generally parallel to the plane of the wheel. The field of vision of the rotated sensor scribes at least a portion of a torus in Euclidean space that is "seen" by the camera. According to one embodiment, the wheel and sensor are positioned so that the rim of the vehicle wheel is within the torus so that the rim is seen by the camera. In this context, the camera sees the rim (or other object within the torus) as a collection of pixels, defined by the camera resolution, that each have an x-y-z coordinate or other coordinate system position such as polar coordinates. In an embodiment, the non-contact sensor projects fanned or structured light onto the wheel to illuminate at a contour lines on the surface of the wheel. The contour line is then read by a light sensor, such as a video camera. The sensor is positioned so as to be offset from the optical plane of the projected light thereby to allowing triangulation in determining the spatial position of pixels within the contour line. As the contour line is rotated around the wheel, the camera captures "slices," each slice including the coordinates in space of a number of points both radially and in the approximate plane of the wheel are sampled along the contour line.

The angular position of the sensor is measured and recorded along with the x-y-z coordinate data. The sensor is engaged with a computer that stores the position and coordinate data associated with the first measurement cycle.

According to one embodiment, before initiating a second measurement cycle, the sensor returns to its original angular position relative to the wheel and the wheel is rotated at least a partial revolution. The second measurement cycle is similar to the first, in that the laser camera is again rotated and captures coordinates associated with a number of pixels in the contour line for each of multiple angular positions during the rotation.

At this point, the computer calculates the plane of the wheel (or other desired wheel alignment characteristic or wheel feature) based upon the two different sets of observed data. The attitude of the plane of the wheel corresponds to an identifiable toe and camber. Thus, according to one embodiment of the present invention very accurate measurement of toe and camber may be accomplished using two measurement cycles of a single vision sensor with a partial revolution of the wheel between measurement cycles.

Exemplary Measurement Device

Figure 1:
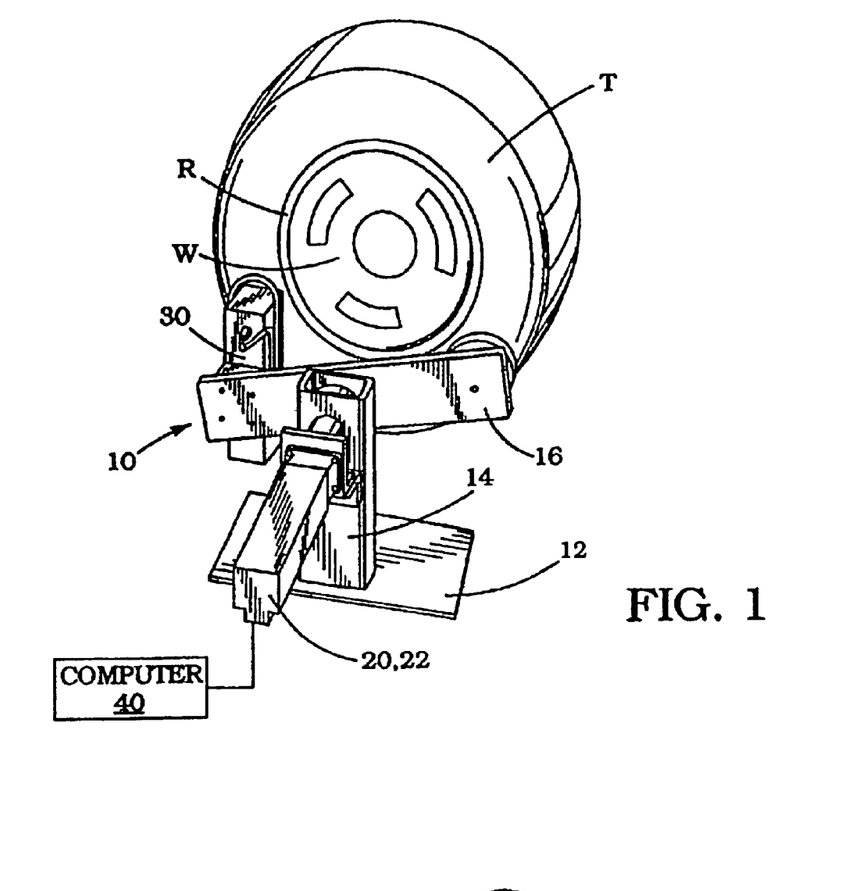
FIG. 1 is a perspective view of a measurement device according to an embodiment of the present invention along with a wheel.
Figure 2:
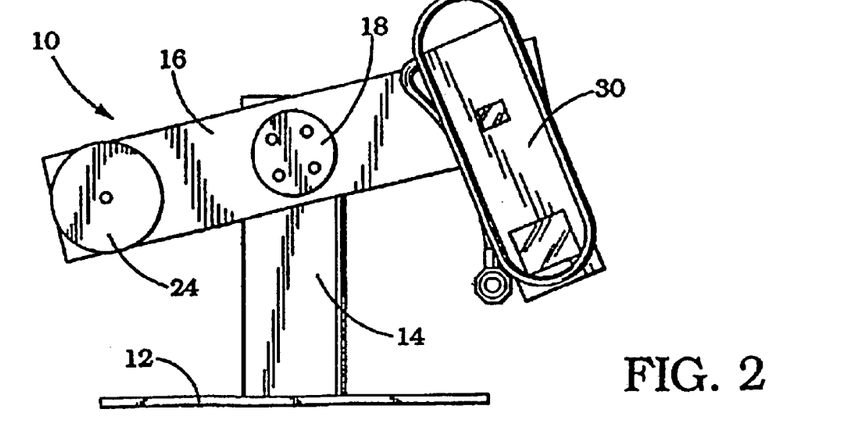
FIG. 2 is a front elevation view of the measurement device according to the embodiment of FIG. 1.

FIGS. 1 and 2 depict a perspective view and a front view, respectively, of a measurement device 10 according to an embodiment of the present invention along with a wheel (W) and tire (T) mounted on the wheel. In this example, the measurement device 10 includes a base 12 and a vertical support 14 extending upward from the base 12. A rotating blade 16 is pivotally connected to an upper section of the support 14 at a spindle 18. The spindle 18 is rotatable to a predefined speed by a motor 20, such as an alternating current (AC) motor. The motor 20 includes (or is engaged with) suitable equipment 22, such as a rotary encoder, a rotary potentiometer, a stepping motor, or the like, for monitoring and recording positional data of the blade 16.

A vision sensor 30 is positioned toward one end of the blade 16. A counterweight 24 is positioned toward the other end of the blade 16 so that the blade 16 is balanced during rotation. According to alternative embodiments, various other mechanisms may be employed to rotate or otherwise position the vision sensor 30 relative to the wheel. For example, the vision sensor 30 may be mounted on a circular track, and slid around the track; or the vision sensor may be positioned on the end of a rod that is rotated in a circle.

Exemplary Vision Sensor

Figure 3:
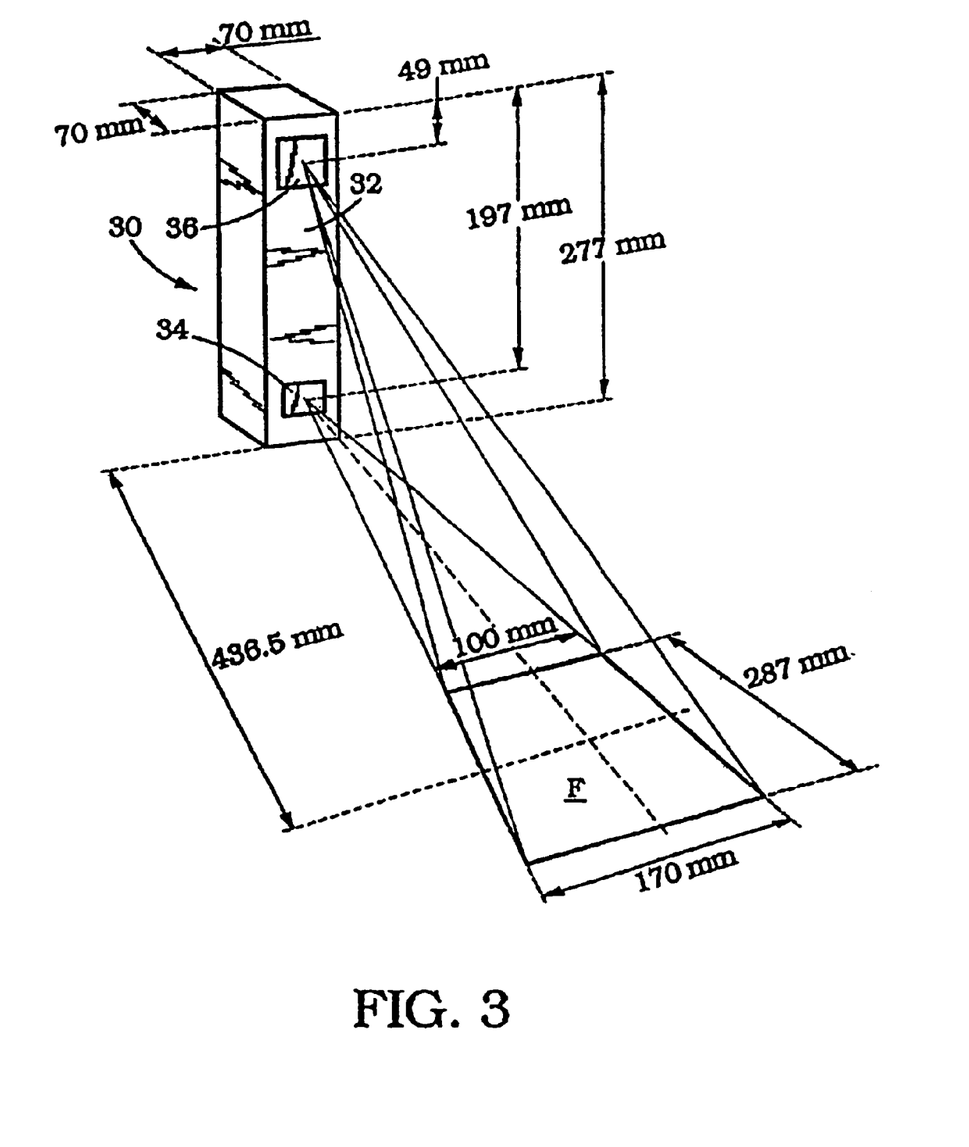
FIG. 3 is perspective schematic view of a vision sensor which may be used according to one embodiment of the present invention.

FIG. 3 is perspective schematic view of a vision sensor 30 which may be used according to one embodiment of the present invention. In this example, the vision sensor 30 incorporates a digital camera capable of measuring by triangulation into a housing 32. Such vision sensors are manufactured for commercial use by at least Perceptron, Inc. and LMI Technologies, Inc.

According to the embodiment depicted, the vision sensor 30 has a laser window 34 through which a beam of coherent light is emitted to intersect a target, and a camera window 36 engaged with a camera (not shown) offset from the laser window 34. The laser window 34 and camera window 36 each have a field of vision, which intersect with one another to form a resulting field of view (F) for the vision sensor 30.

In alternative embodiments, various other devices capable of measuring distance, such as radar, acoustic, ultrasonic range sensing devices or other machine vision devices capable of imaging a volume of space and determining coordinates of a set of pixels within the space may be employed.

Figure 4A:
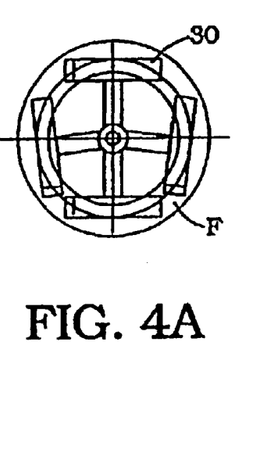
FIGS. 4A, 4B, and 4C are schematic representations of the swept volume of a camera vision sensor in relation to the position of a wheel to be characterized according to one embodiment of the present invention.
Figure 4B:
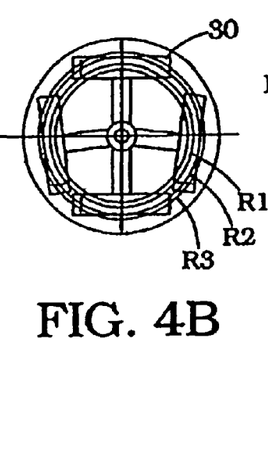
Figure 4C:
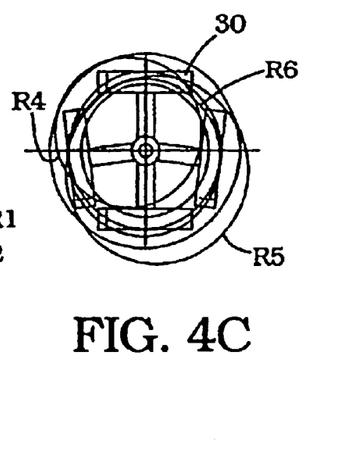

FIGS. 4A, 4B, and 4C are schematic representations of the swept volume of a camera vision sensor in relation to the position of a wheel to be characterized according to one embodiment of the present invention. Importantly, it is not necessary for the center of the wheel (W) to be exactly aligned with the center of rotation of the vision sensor 30 (i.e., the spindle 18). In this examples illustrated by FIGS. 4A–4C, the motion of the vision sensor 30 is shown as it is revolved as well as the resulting field of vision (F). FIG. 4B shows the outlines of three rims R1, R2, R3 having differing diameters that are centered in relation to the measurement device 10. Since each of the rims are within the field of vision (F), they can be characterized. FIG. 4C shows the outlines of three rims R4, R5, and R6, having differing diameters that are not centered in relation to the measurement device 10. Depending upon the diameter of the rim and the degree of offset between the center of the rim and the measurement device 10, enough of each rim may be within the field of vision (F) to characterize the rim. It is not necessary for the entirety of the rim to be within the field of vision (F), as the rim may be characterized if only a portion of the rim is seen by the vision sensor 30.

Vehicle Wheel Alignment Characteristic Determination

Figure 5A:
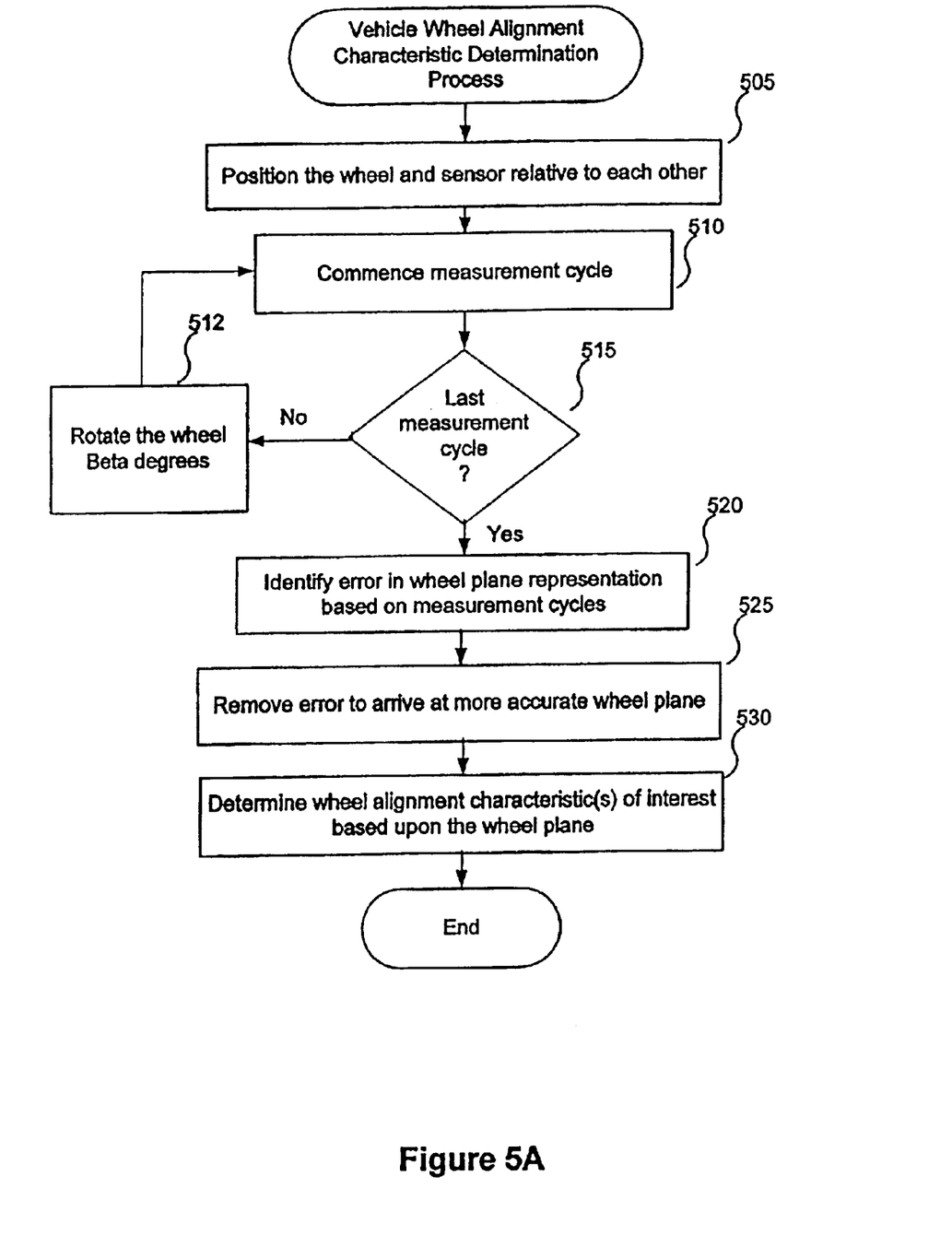
FIG. 5A is a flow diagram illustrating a vehicle wheel alignment characteristic determination process according to one embodiment of the present invention.

FIG. 5A is a flow diagram illustrating a vehicle wheel alignment characteristic determination process according to one embodiment of the present invention. In this example, the process begins at block 505. At block 505, the vehicle wheel and the sensor are positioned relative to each other. This typically includes rolling the vehicle onto a ramp system, such as that depicted in FIGS. 6–9, and adjusting the vision sensors to accommodate the vehicle's wheel base.

With reference again to FIG. 1, a wheel (W) (having a rim (R)) on which tire (T) is mounted is positioned in front of the measurement device 10. The wheel (W) is positioned so that the rim (R) and/or tire (T) are within the field of view of vision sensor 30. Thus, a preferred distance for the exemplary vision sensor 30 described with reference to FIG. 3 is about 436.5 mm, although the position is not critical so long as a sufficient portion of the wheel (W) is within the field of view (F). Generally, it is desirable to position the plane of the wheel (W) substantially parallel to the plane of rotation of the vision sensor 30. However, the measurement device 10 can perform satisfactorily even if the wheel (W) is oriented at an angle to the plane of rotation of the vision sensor 30, provided that the angle is known and is within the operating specifications of the vision sensor 30.

Figure 5B:
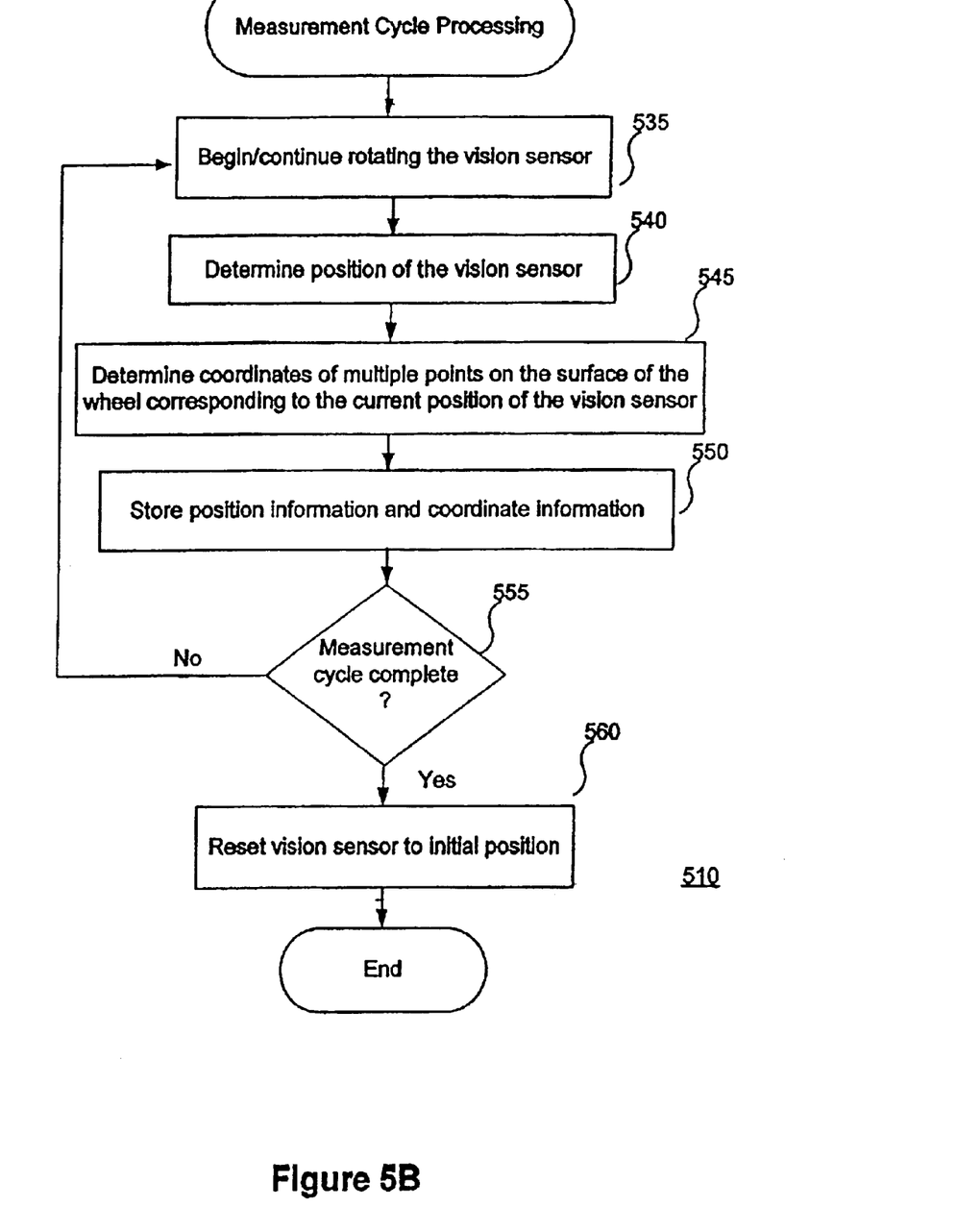
FIG. 5B is a flow diagram illustrating a measurement cycle process according to one embodiment of the present invention.
Figure 6:
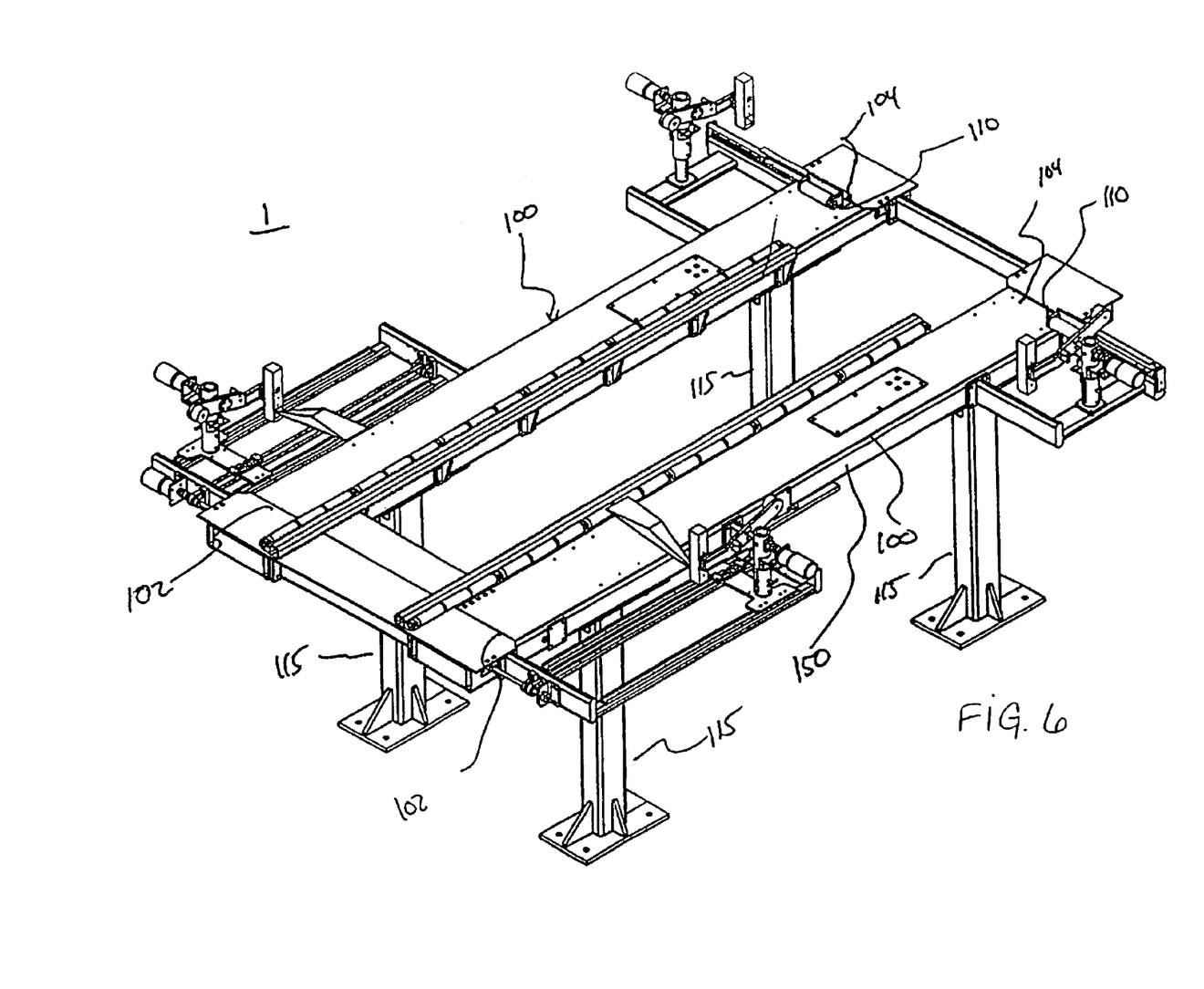
FIG. 6 is a perspective view of a vehicle wheel alignment system according to one embodiment of the present invention.
Figure 7:
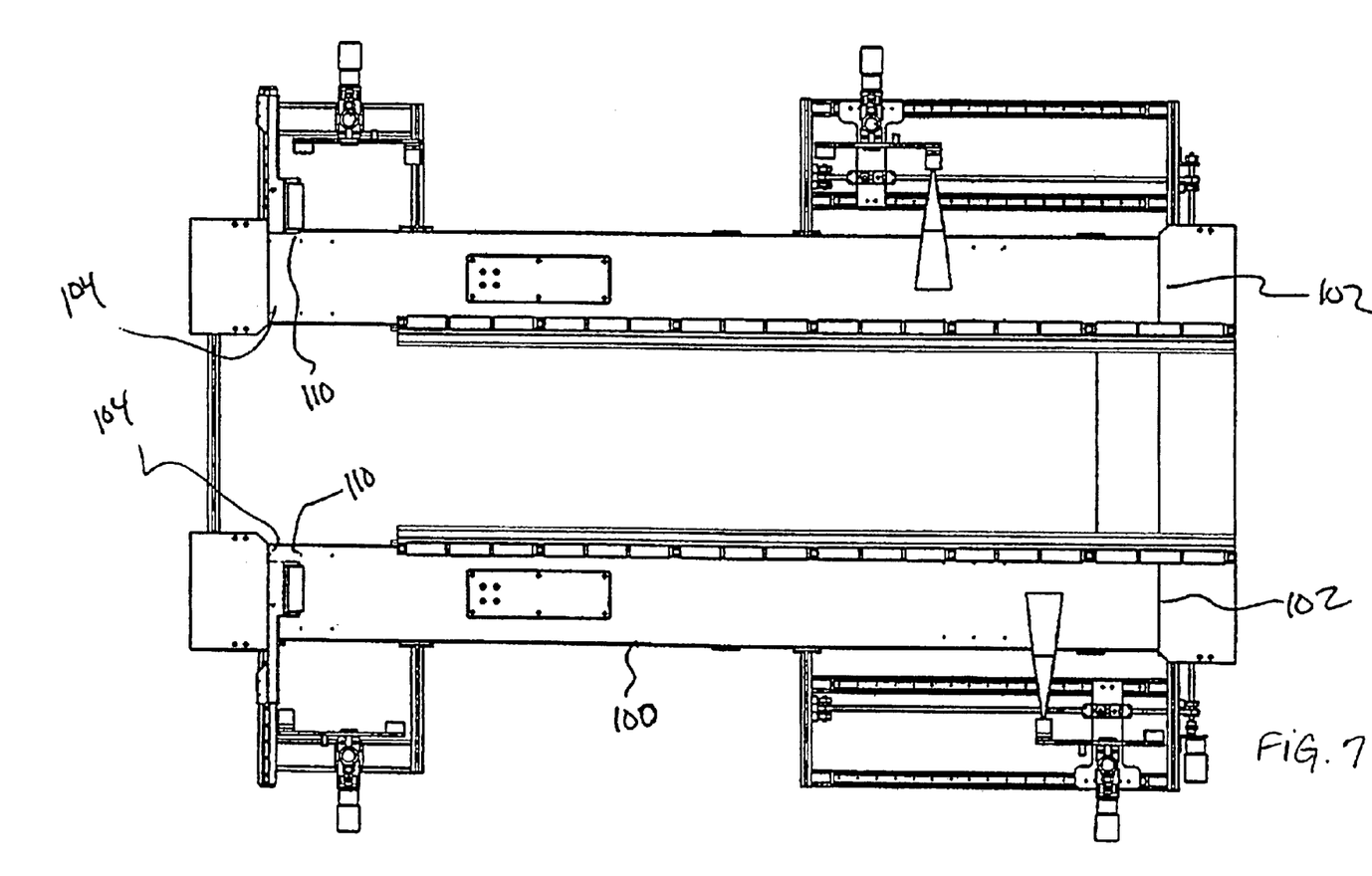
FIG. 7 is a top view of the vehicle wheel alignment system of FIG. 6.

At block 510, a first measurement cycle is commenced during which information is captured regarding the coordinates of points on the wheel at various angular positions of the vision sensor. Such a measurement cycle, among other information, provides information regarding the distance of the surface of the wheel from the sensor which can be represented as a sum of sines and cosines. For example, for the first sweep with the wheel in its initial position, angle a, the distance, Z, from the sensor to the wheel may be represented in the form:

$$Z = A\sin(\alpha) + B\cos(\alpha) + C\sin(\alpha) + D\cos(\alpha) \qquad \text{Equation \#1}$$

where, the first sine and cosine sum represents the pure toe and camber plane and the second sine and cosine sum represents the wobble or error (e.g., due to runout). Further description of measurement cycle processing is provided below with reference to FIG. 5B.

At decision block 515, a test is made to determine whether a sufficient number of measurement cycles have been performed. Empirical analysis performed by the assignee of the present invention indicates two measurement cycles are sufficient to produce toe and camber error in the estimated plane on the order of thousandths of a degree, which is well within the range of acceptable alignment setting capability. However, more than two measurement cycles may be performed if desired. At any rate, once the desired number of measurement cycles have been performed, processing continues with block 520. However, until the desired number of measurement cycles have been performed, processing branches to block 512.

At block 512, the wheel is rotated by β degrees. According to one embodiment, β is between 90 and 30 degrees. According to another embodiment, β is selected based on the sweep of the vision sensor 30 to create an overlap between the first and second measurement cycles. For example, assuming the sweep of the vision sensor 30 were 315 degrees, it might be desirable to rotate the wheel at least 45 degrees between measurement cycles.

The wheel may be rotated by keeping the vehicle stationary and sliding the plate upon which the wheel rests as discussed further below. Alternatively, the vehicle may be rolled forward or backward and the measuring devices moved to follow the vehicle movement.

After rotating the wheel has been rotated at least a partial revolution, a second measurement cycle is commenced at block 510 during which information is again captured regarding the coordinates of points on the wheel at various angular positions of the vision sensor. During the second measurement cycle, the distance of the surface of the wheel from the sensor can be represented as:

$$Z = A\sin(\alpha) + B\cos(\alpha) + C\sin(\alpha+\beta) + D\cos(\alpha+\beta) \quad \text{Equation \#2}$$

where, the first sine and cosine sum remains unchanged as the pure toe and camber plane is dependent upon the vehicle's attitude and geometry and is therefore a constant for purposes of this example; and where the second sine and cosine sum again represents the wobble or error, but shifted in phase by β degrees.

Assuming two measurement cycles are all that is desired, processing will proceed from decision block 515 to block 520. At block 520, the error in the wheel plane representation is identified based on the two sets of measurement data gathered during the separate measurement cycles. For example, the difference between the two sweeps can be determined to distinguish the wobble or error from the true toe and camber. According to one embodiment a Fourier decomposition method is employed.

At block 525, the wobble or error identified in block 520 may be eliminated to arrive at an estimated wheel plane. Additionally, other perturbations on the wheel, such as "bumps," may be eliminated by filtering out higher Fourier Series components.

Finally, at block 530, the estimated wheel plane may be used to determine one or more alignment characteristics of the wheel, such as toe and camber. For example, the computer 40 may calculate the plane of the wheel (W) from data stored during the measurement cycles which has been error corrected and filtered in accordance with the method described above.

Measurement Cycle

FIG. 5B is a flow diagram illustrating the measurement cycle process of block 510 according to one embodiment of the present invention. In this example, the process begins at block 535. At block 535, rotation of the vision sensor 30 relative to the wheel (W) is commenced, via the motor 20. At block 540, the position of the vision sensor 30 is determined. Such determination may be performed via the equipment 22 at periodic or predetermined time intervals, for example.

At block 545, coordinates of multiple points on the surface of the wheel (W) corresponding to the current position of the vision sensor 30 are determined. According to one embodiment, this involves the vision sensor 30 acquiring the image data within its field of view (F).

At block 550, the position information and coordinate information are stored. According to one embodiment, the data is provided to computer 40 for post processing and storage in RAM or on mass storage device. Thus, the computer 40 stores a set of image data which is a collection of spatial coordinates for each acquisition, that is referenced by the angular position of the vision sensor 30.

At decision block 555, a determination is made whether the measurement cycle is complete. Completeness of the measurement cycle may be determined with reference to a predetermined desired sweep coverage by the vision sensor 30 or by data sufficient to achieve a certain level of accuracy having been gathered, for example. According to one embodiment, the vision sensor 30 is swept at least 270 degrees. However, in alternative embodiments, the sweep of the vision sensor 30 may be in the range of 180 to 360 degrees. As mentioned earlier, according to one embodiment, a relationship may be established between the sweep of the vision sensor 30 and the rotation of the wheel. For example, to achieve the desired level of wheel plan accuracy certain implementations may call for, it may be useful to have the sum of the sweep of the vision sensor 30 and the rotation of the wheel between measurement cycles total 360 degrees or more. According to one embodiment, such sum is 317 degrees, representing a 270 degree sweep by the vision sensor and a 47 degree rotation of the wheel.

Multiple revolutions may also be statistically averaged together. During the revolution, the vision sensor 30 collects data at a number of different angular positions (i.e., it takes a number of "shots" or "slices" of the wheel). For example, the surface of the wheel may be sampled every 10 degrees. At any rate, if the measurement cycle is complete, the processing continues with block 560; otherwise, processing branches back to block 535 where the vision sensor 30 continues rotating and the sampling and storage of position and coordinate data continue.

After the measurement cycle is complete, at block 565, the vision sensor 30 is returned to its initial position in anticipation of performing subsequent measurement cycles. However, in alternative embodiments, the vision sensor 30 may commence subsequent measurement cycles from the position where it completed the prior measurement cycle.

Vehicle Wheel Alignment System

FIGS. 6–9 depict perspective, top, side and bottom views, respectively, of a vehicle wheel alignment system 1 according to one embodiment of the present invention. In the embodiment depicted, the vehicle wheel alignment system 1 includes two movable plates 100 which are moveably attached to platform 150. Each plate 100 has a first end 102 and a second end 104. System 1 also includes two adjustable wheel rollers 110. Plates 100 may be inclined such that first end 102 is slightly higher then second end 104. Thus, the wheels of a vehicle (not shown) parked on plates 102, will be pulled by gravity against rollers 110. According to one embodiment, the incline of the plates 100 may be adjusted responsive to the weight of the vehicle.

Figure 8:
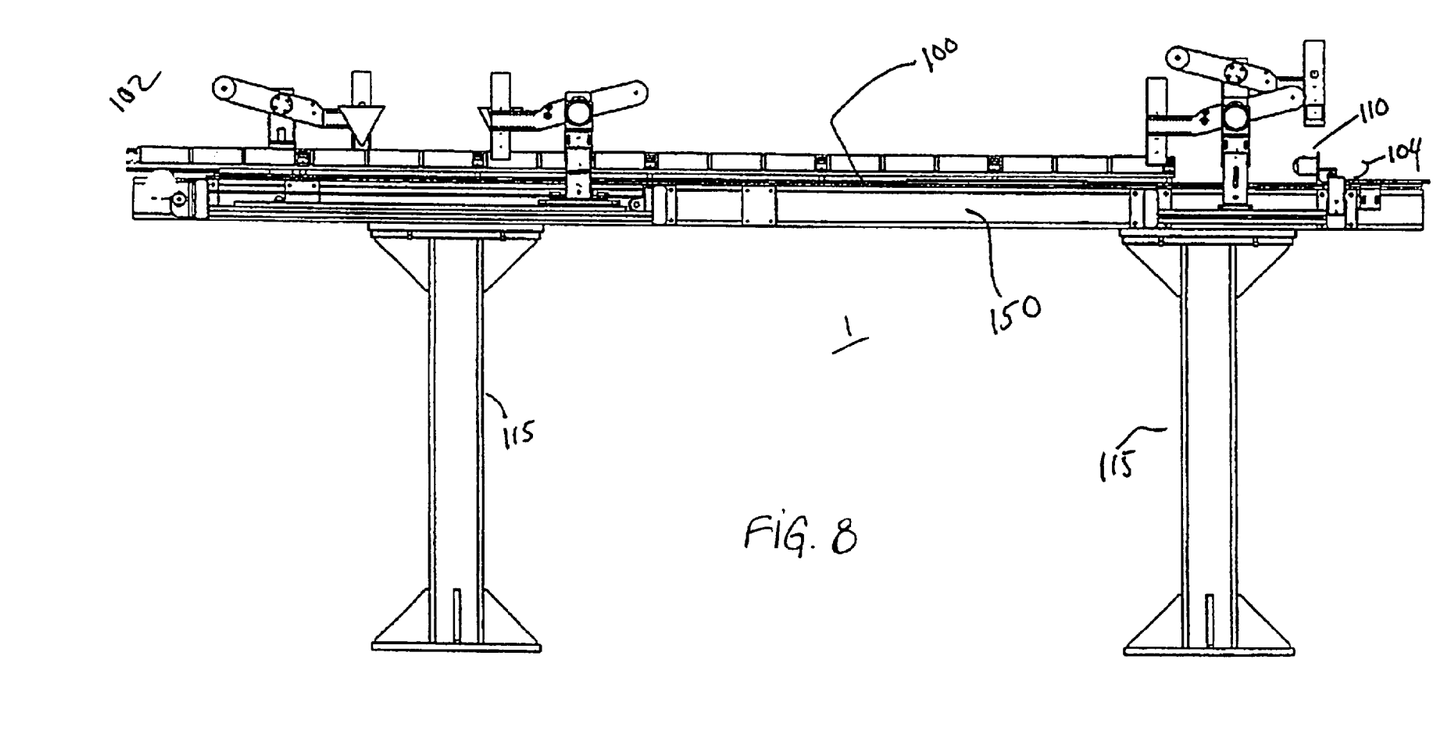
FIG. 8 is a side view of the vehicle wheel alignment system of FIG. 6.
Figure 9:
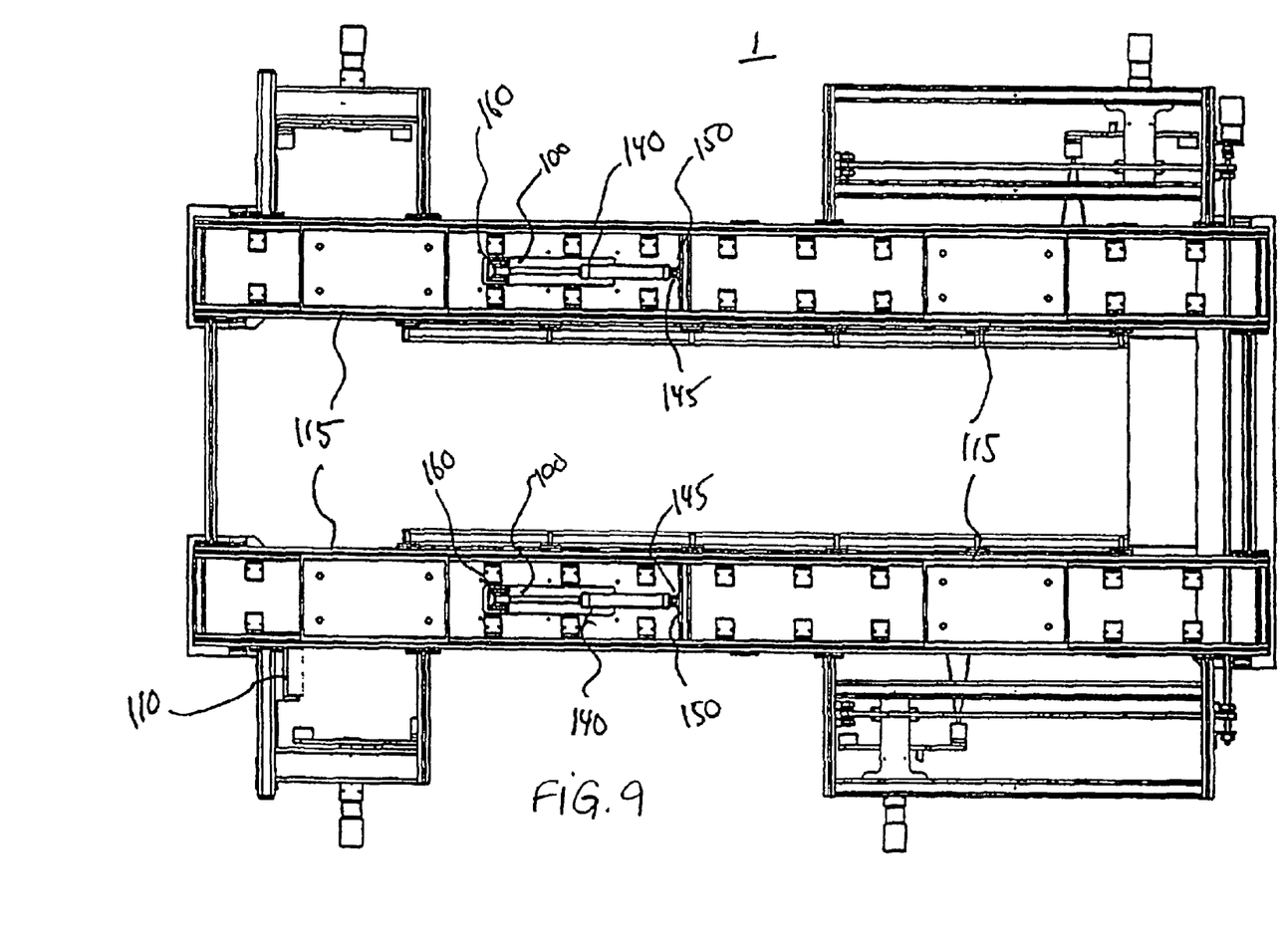
FIG. 9 is a bottom view of the vehicle wheel alignment system of FIG. 6.

In FIG. 8, a pair of hydraulic or pneumatic rams 140, are shown, each having a first end 145 securely attached to platform 150 and a second end 160 securely attached to plate 100. In operation, the rams 140 can expand and contract thereby moving plates 100. If a vehicle (not shown) is placed on plates 100 and the transmission is left in neutral, the movement of plates 100 will cause the wheels of the vehicle to rotate. Because plates 100 are inclined, the vehicle will remain in contact with wheel rollers 110, even while plate 100 is moved. Thus, the wheels can be rotated without needing to move the vehicle or the wheel inspection system. Thus, potential errors associated with moving the vehicle are eliminated. In addition, safety is enhanced and complexity of the system 1 is reduced by not having to deal with movement of the vehicle during measurement. For example, when moving the "floor" underneath the wheels, there is movement of less mass as compared to moving the vehicle. Therefore, allowing use of less costly components. Further, the issue of tooling attached to the vehicle is less of a problem and the Headlamp Aim production environment process, which may be performed concurrently with the alignment processing, is not disturbed since the position of the vehicle remains the same. Finally, the moving plate approach is thought to be more reliable since track movement is cleaner and more repeatable than movement of the vehicle.

While the above embodiment illustrates only one vision sensor 30 per wheel being measured, more than one vision sensor 30 may be employed. For example, counterweight 24 could be replaced with another vision sensor 30 and the results obtained by the two vision sensors 30 could be averaged.

According to alternative embodiments, the wheel could be rotated during measurement cycles (e.g., as the vision sensor 30 revolves), provided that the wheel and sensor do not rotate in resonance with one another, so that sensor can "see" an adequate number of points on the wheel (W).

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:
    a vision sensor having a field of vision, the vision sensor capable of determining spatial coordinates of a group of points within the field of vision;
    a motor to rotate the vision sensor through a plurality of angular positions with respect to a wheel to be characterized during a first measurement cycle and a second measurement cycle so that the fields of vision associated with the plurality of angular positions together form at least a portion of a torus;
    a positional recorder to collect, for each of the plurality of angular positions, spatial coordinates of a plurality of points located on a surface of the wheel and within the torus during the first measurement cycle and to collect, for each of the plurality of angular positions, spatial coordinates of a plurality of points located on the surface and within the torus during the second measurement cycle;
    a moveable plate, with which the wheel interfaces, to rotate the wheel from a first position to a second position between the first measurement cycle and the second measurement cycle; and
    a computer to determine one or more characteristics of the wheel based upon the spatial coordinates collected during the first measurement cycle and the spatial coordinates collected during the second measurement cycle.

2. The apparatus of claim 1, wherein a characteristic of the one or more characteristics of the wheel comprises an alignment characteristic of the wheel.

3. The apparatus of claim 2, wherein a characteristic of the one or more characteristics of the wheel comprises toe.

4. The apparatus of claim 2, wherein a characteristic of the one or more characteristics of the wheel comprises camber.

5. The apparatus of claim 2, wherein a characteristic of the one or more characteristics of the wheel indicates whether the wheel has any irregularities in its sidewall.

6. A method comprising:
    during a first measurement cycle, obtaining spatial coordinates of a plurality of points on a wheel to be characterized by positioning a vision sensor at a plurality of angular offsets relative to the wheel, the plurality of points sampled from each of the plurality of angular offsets;
    rotating the wheel from a first position to a second position between the first measurement cycle and a second measurement cycle, by moving a plate underneath the wheel with which the wheel interfaces;
    during the second measurement cycle, obtaining spatial coordinates of a plurality of points on the wheel by positioning the vision sensor at a plurality of angular offsets relative to the wheel, the plurality of points sampled from each of the plurality of angular offsets; and
    determining one or more characteristics of the wheel based upon the spatial coordinates collected during the first measurement cycle and the spatial coordinates collected during the second measurement cycle.

7. The method of claim 6, wherein the plurality of points lie on a sidewall of the wheel.

8. The method of claim 6, wherein the plurality of points lie on a rim of the wheel.

9. The method of claim 6, further comprising rotating the vision sensor during the first measurement cycle and during the second measurement cycle.

10. The method of claim 9, wherein said rotating the vision sensor comprises rotating the vision sensor in a circular arc approximately 270 degrees.

11. The method of claim 9, wherein said rotating the vision sensor comprises rotating the vision sensor in a non-circular arc.

12. The method of claim 6, wherein said determining one or more characteristics is unaffected by the wheel having negligible runout.

13. The method of claim 6, further comprising measuring and recording an angular position of the vision sensor relative to the wheel along with those of the spatial coordinates corresponding to the angular position.

14. The method of claim 6, wherein said determining one or more characteristics of the wheel involves Fourier decomposition.

15. An apparatus comprising:
    a sensor means, having a field of vision, for determining spatial coordinates of a group of points within the field of vision;
    a means for rotating the vision sensor through a plurality of angular positions with respect to a wheel of a vehicle to be characterized during a first measurement cycle and a second measurement cycle so that the fields of vision associated with the plurality of angular positions together form at least a portion of a torus;
    a positional recording means for collecting, for each of the plurality of angular positions, spatial coordinates of a plurality of points located on a surface of the wheel and within the torus during the first measurement cycle and for collecting, for each of the plurality of angular positions, spatial coordinates of a plurality of points located on the surface and within the torus during the second measurement cycle;

a means for maintaining the vehicle in substantially the same position while rotating the wheel from a first position to a second position between the first measurement cycle and the second measurement cycle; and a means for determining one or more characteristics of the wheel based upon the spatial coordinates collected during the first measurement cycle and the spatial coordinates collected during the second measurement cycle.

16. A method comprising:

during a first measurement cycle, a step for obtaining spatial coordinates of a plurality of points on a wheel to be characterized by positioning a vision sensor at a plurality of angular offsets relative to the wheel, each of the plurality of points corresponding to a different one of the plurality of angular offsets;

a step for rotating the wheel from a first position to a second position between the first measurement cycle and a second measurement cycle by a movement of a plate underneath the wheel;

during the second measurement cycle, a step for obtaining spatial coordinates of a plurality of points on the wheel by positioning the vision sensor at a plurality of angular offsets relative to the wheel, each of the plurality of points corresponding to a different one of the plurality of angular offsets; and a step for determining one or more characteristics of the wheel based upon the spatial coordinates collected during the first measurement cycle and the spatial coordinates collected during the second measurement cycle.

17. A method comprising:

during a first measurement cycle, obtaining spatial coordinates of a plurality of points on a wheel to be characterized by positioning a single movable vision sensor at a plurality of angular offset relative to the wheel, the plurality of points sampled from each of the plurality of angular offsets;

rotating the wheel from a first position to a second position between the first measurement cycle and a second measurement cycle, by moving a plate underneath the wheel with which the wheel interfaces;

during the second measurement cycle, obtaining spatial coordinates of a plurality of points on the wheel by positioning the single moveable vision sensor at a plurality of angular offsets relative to the wheel, the plurality of points sampled from each of the plurality of angular offsets; and determining one or more characteristics of the wheel based upon the spatial coordinates collected during the first measurement cycle and the spatial coordinates collected during the second measurement cycle.

18. The method of claim 17, wherein the wheel is stationary during at least one of the measurement cycles.

19. A method comprising:

determining a first set of measurements from which a first approximation of a plane of a wheel of a vehicle may be derived by periodically measuring a distance from a vision sensor to a surface of the wheel at a plurality of angular positions while rotating the vision sensor in a substantially circular arc relative to the wheel;

rotating the wheel a predetermined angle about an axis of the wheel by expanding or contracting a hydraulic or pneumatic ram coupled to a moveable plate upon which the wheel rests;

determining a second set of measurement from which a second approximation of the plane of the wheel may be derived by periodically measuring the distance from the vision sensor to the surface while again rotating the vision sensor relative to the wheel;

and determining one or more alignment characteristics of the wheel based on the first set of measurements and the second set of measurements by removing an error competent contributing to inaccuracy of the first approximation of the plane of the wheel and the second approximation of the plane of the wheel.

20. The method of claim 19, wherein the first approximation of the plane of the wheel and the second approximation of the plane of the wheel are modeled as a sum of sinusoids including a first sinusoid representing a basic plane of the wheel and a second sinusoid representing the error component.

21. The method of claim 19, wherein the predetermined angle is greater than or equal to ninety degrees.

22. The method of claim 19, wherein the predetermined angle is between thirty and ninety degrees.

23. The method of claim 19, wherein the predetermined angle is selected based on the sweep of the vision sensor to create an overlap between the first and second measurement cycles.

24. A wheel alignment system comprising:

a platform to support a vehicle;

a vision sensor associated with the platform, the vision sensor having a field of vision and capable of determining spatial coordinates of a group of points within the field of vision:

a motor coupled to the vision sensor to rotate the vision sensor through a plurality of angular positions with respect to a wheel of the vehicle to be characterized during a first measurement cycle and a second measurement cycle so that the fields of vision associated with the plurality of angular positions together form at least a portion of a torus;

a positional recorder associated with the vision sensor to collect, for each of the plurality of angular positions, spatial coordinates of a plurality of points located on a surface of the wheel and within the torus during the first measurement cycle and to collect, for each of the plurality of angular positions, spatial coordinates of a plurality of points located on the surface and within the torus during the second measurement cycle;

at least one inclined moveable plate moveably attached to the platform, the at least one inclined moveable plate configured to interface with the wheel and rotate the wheel from a first position to a second position between the first measurement cycle and second measurement cycle by expanding or contracting a hydraulic or pneumatic ram coupled to the at least one included moveable plate ans the platform; and a computer to determine one or more characteristics of the wheel based upon the spatial coordinates collected during the first measurement cycle and the spatial coordinates collected during the second measurement cycle.

* * * * *